United States Patent [19]
Guhl et al.

[11] 3,966,254
[45] June 29, 1976

[54] TRANSMISSION NEUTRALIZER

[75] Inventors: Richard E. Guhl, Decatur; Kenneth W. Renfro, Macon, both of Ill.

[73] Assignee: Caterpillar Tractor Co., Peoria, Ill.

[22] Filed: Feb. 4, 1975

[21] Appl. No.: 546,947

[52] U.S. Cl. .......................... 298/22 C; 180/53 R; 214/504
[51] Int. Cl.² ...................................... F16H 57/10
[58] Field of Search .......... 298/22 C, 22 R; 180/53; 214/504; 192/3.62, 3.63

[56] References Cited
UNITED STATES PATENTS 3,695,710  10/1972  Cresci ........................... 298/22 C

*Primary Examiner*—Philip Goodman
*Attorney, Agent, or Firm*—Wegner, Stellman, McCord, Wiles & Wood

[57] ABSTRACT

A control structure for neutralizing the transmission of a dump truck when the console switch is in a "reverse" position to prevent the truck operator from inadvertently backing the truck in the event the transmission control is in the "reverse" position at the time the operator accelerates the truck engine to operate the hoist cylinder of the dump body. A conventional dump truck hydraulic transmission system is utilized with the control for the hoisting mechanism being electrically related thereto.

10 Claims, 3 Drawing Figures

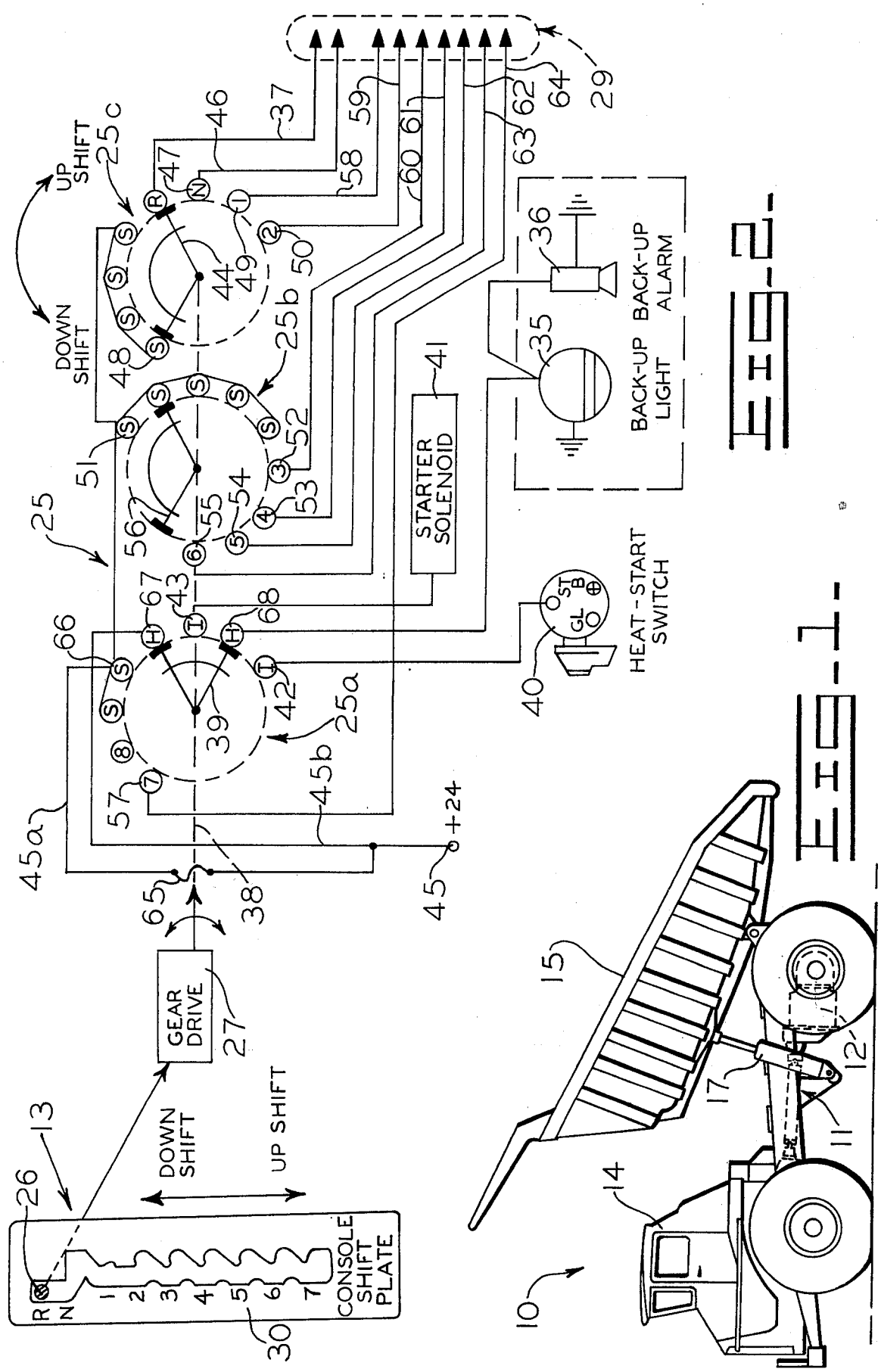

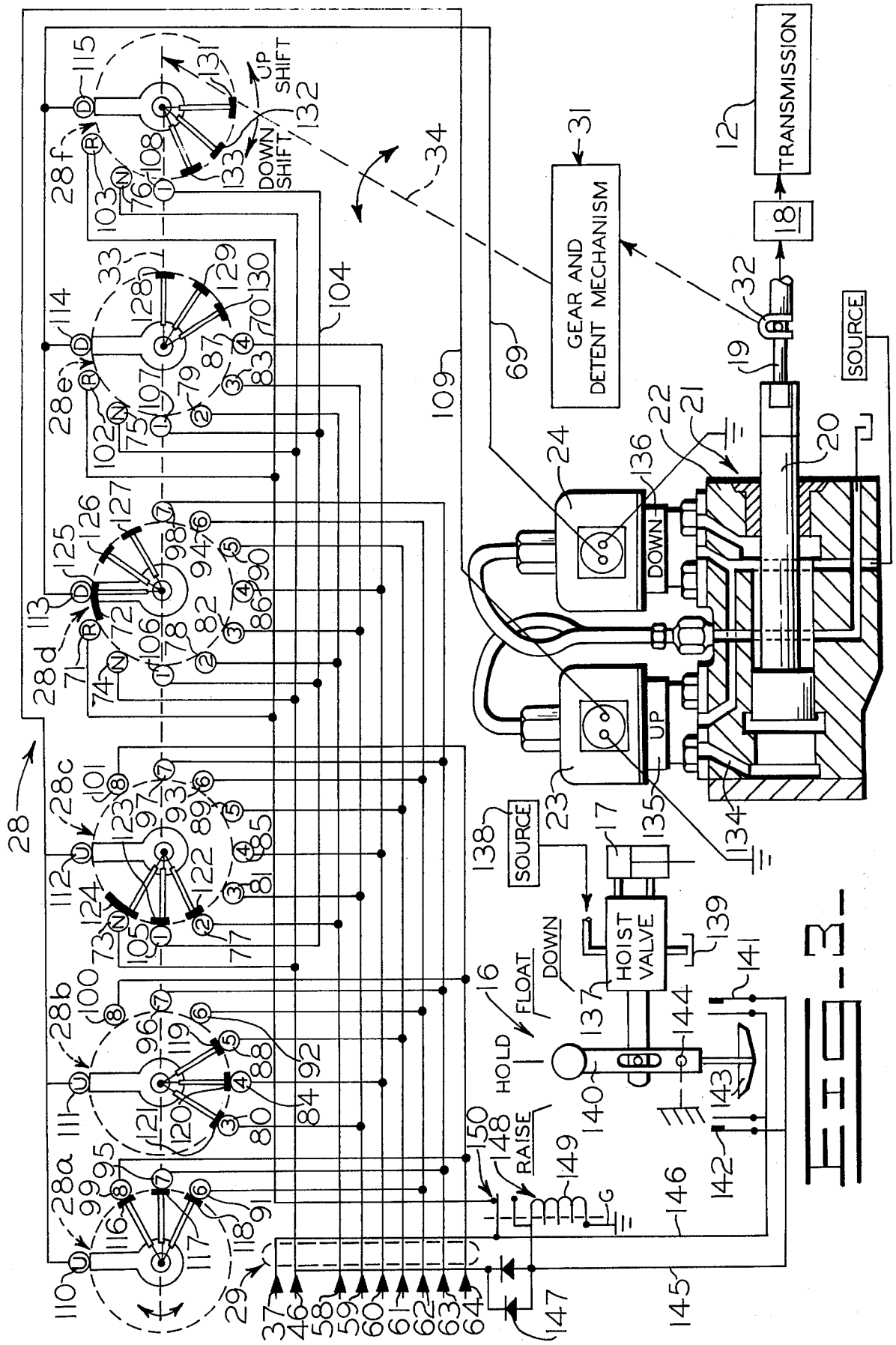

TRANSMISSION NEUTRALIZER

BACKGROUND OF THE INVENTION

1. Field of the Invention

The invention relates to truck controls and in particular to safety controls for preventing inadvertent backing of a dump truck while raising the dump body.

2. Description of the Prior Art

In one conventional dump truck, the truck drive includes a hydraulically controlled power shift transmission including a plurality of automatic forward speeds and one reverse speed selection. A manual selector valve for conditioning the transmission is located at the transmission for operation by a solenoid operated shift cylinder. The shift cylinder is controlled by an electrical switch means responsive to a console shift lever under the manual control of the operator in the truck cab.

The console shift lever may be selectively positioned in a reverse position, a neutral position, or in any one of the plurality of different forward positions, to place the transmission in the desired operating range.

The dump body of such dump trucks is positioned by a hydraulic hoist which is selectively operated by a hydraulic control provided with a manual control lever. The hydrualic hoist control may be selectively positioned in a "hold" position for maintaining the dump body in a preselected position, a "float" position permitting the dump body to move downwardly under the weight thereof from an elevated position to a lowered position, and "raise" and "down" positions for powering the dump body selectively to the raised or lowered positions.

A problem arises in the use of such dump trucks in that operation of the hoist means in the power driven mode, i.e., in the "raise" or power "down" modes, requires an increased flow of hydraulic fluid from the engine driven pump. The operator customarily accelerates the engine to at least a high idle position to provide this necessary additional hydraulic pumping action. In the event the operator forgets to shift the truck from the reverse position in initiating the power dumping action, the extremely hazardous condition arises of causing the truck to move rearwardly inadvertently. This condition is extremely dangerous where the truck is used to dump into a pit or over an embankment.

A number of different controls for neutralizing a vehicle transmission under certain operating conditions have been developed in the art. Illustratively, as shown in the Edward J. Lammers et al United States Letters Patent 3,565,220, owned by the assignee hereof, a control system is provided having an interconnection between the brakes and the transmission to neutralize the transmission when either one of two different sets of brakes is applied.

In United States Letters Patent 3,033,333 of Ulysses A. Breting et al, a cutoff valve is provided for placing the transmission in a neutral condition upon application of the vehicle brakes. Similarly, in United States Letters Patent 3,181,667 of Kenneth R. Lohbauer et al and United States Letters Patent 3,339,672 of Richard E. Crandall, controls are provided for neutralizing the vehicle transmission by operation of the vehicle brakes. In the Crandall structure, the control further neutralizes the transmission selectively by relieving clutch fluid pressure.

SUMMARY OF THE INVENTION

The present invention comprehends an improved transmission neutralizer permitting the use of a conventional hydraulic transmission system with the hoisting mechanism control being electrically related to the transmission system to prevent undesirable reverse operation of the truck during a power driven operation of the dump body hoist means.

More specifically, the present invention comprehends the provision in such a dump vehicle of means for preventing reverse operation of the vehicle wheel drive irrespective of the disposition of a transmission selector means when the dump body control means of the vehicle is arranged to move the dump body.

More specifically, the invention comprehends such a control wherein the dump body control means is selectively arrangeable to power the dump body to raised and lowered positions, with the transmission control means preventing movement of the truck when the dump body control means is arranged to power the dump body.

The control permits the transmission selector to remain in a reverse position while preventing operation of the transmission in the reverse mode and more specifically, causing the transmission to be placed in the neutral mode.

The control prevents shifting of the transmission to the reverse mode when the hoist control valve is moved from a power position during the dump cycle, such as to a "float" or "hold" position. More specifically, the control requires that the operator return the transmission console lever to the neutral position before operation of the transmission by the operator may be effected.

Thus, the control of the present invention provides an improved safety means in such a dump truck vehicle requiring that the operator deliberately move the transmission control lever to a position other than the reverse position to effect a movement of the truck when the dump body hoist controls are in a power position. The control means of the present invention is extremely simple and economical of construction and permits the use of conventional transmission equipment without modification for facilitated installation on existing dump truck equipment.

BRIEF DESCRIPTION OF THE DRAWING

Other features and advantages of the invention will be apparent from the following description taken in connection with the accompanying drawing wherein:

FIG. 1 is a side elevation of a dump truck having a transmission neutralizer embodying the invention;

FIG. 2 is a schematic block diagram of a portion of the control embodying the invention with the operator controlled console lever; and FIG. 3 is a schematic block diagram of a portion of the control which is located at the transmission of the dump truck.

DESCRIPTION OF THE PREFERRED EMBODIMENT

In the exemplary embodiment of the invention as disclosed in the drawing, a dump truck generally designated 10 includes a power drive 11 including a transmission 12 for moving the truck vehicle selectively in forward and reverse modes by means of a manually operable control 13 mounted in a cab portion 14 of the truck. The dump truck further includes a dump body 15 which is selectively driven to a raised dump position and a lowered carrying position under the control of a manually operable dump body control generally designated 16 also provided in the cab portion of the truck.

As shown in FIG. 1, transmission 12 may be disposed remotely of cab 14. The dump body 15 is positioned by means of a hoist cylinder 17 which similarly is remotely disposed relative to the cab body.

Transmission 12 comprises a conventional hydraulically controlled power-shift transmission illustratively having seven automatic speeds forward and one speed reverse. Manual selector valve 18 is provided for controlling the transmission 12 and is mechanically connected through a linkage 19 to a spool 20 of an operator 21. Operator 21 includes a cylinder 22 and a pair of electrical solenoids 23 and 24 for selectively controlling the positioning of spool 20 in cylinder 22.

Control of the solenoids is effected by switching apparatus generally designated 25 which is selectively positioned by means of a console shift lever 26 in the vehicle cab 14 which is connected to switching apparatus 25 through a suitable gear drive 27. A second, multiple deck transmission switching apparatus generally designated 28 is located adjacent transmission 12 with the interconnection between switches 25 and 28 being effected by suitable electrical leads generally designated 29.

As shown in FIG. 2, shift lever 26 may be selectively positioned in any one of seven different forward positions and a reverse position disposed oppositely of a neutral position indicated by a console shift plate 30. Shift signals developed in switch 25 are transmitted through switch 28 to control the respective solenoids 23 and 24 as a result of the positioning of shift lever 26 in the selected position. A gear and detent mechanism generally designated 31 is mechanically connected to linkage 19 by a connection 32 and, in turn, drives a shaft 33 of switch 28 through a suitable connection 34 to correspondingly position shaft 33 in response to movement of linkage 19.

Thus, in normal operation, control of transmission 12 is effected by the operator suitably positioning the shift lever 26 at the truck cab whereby electrical signals are generated from switch 25 through interconnecting wires 29 and switch 28 at the transmission for suitably controlling the solenoids 23 and 24 to effect the desired positioning of spool 20. Mechanism 31 effectively provides a feedback control for repositioning switch 28 as a result of the movement of the spool 20 to effect a stepwise adjustment of the transmission 12. The resultant repositioning of switch 28 effects a pulsed operation of the selected solenoid to effect a step-by-step adjustment of the transmission in the conventional transmission selection manner.

In illustrating the invention, the control is shown as arranged with the shift lever in the reverse position. In this position, the switch 25 provides power through a first deck 25a thereof to a backup light 35 and a backup alarm 36. Concurrently, power is provided to a third deck 25c of switch 25 to a downshift signal line 37.

Movement of the shift lever 26 from the reverse position to a neutral position causes gear drive 27 to rotate shaft 38 of switch 25 in a clockwise direction one position. Such repositioning of deck 25a causes movable contacts 39 thereof to connect the starter switch 40 of the engine to the starter solenoid 41 to fixed contacts 42 and 43 for engine starting. At the same time, movable contacts 44 of deck 25c connect the positive power supply lead 45 to an upshift signal line 46 connected to fixed contact 47 of shift deck 25c. As seen in FIG. 2, movable contacts 44 communicate with the power supply lead 45 through four fixed contacts 48 to provide electrical power from lead 45 in the reverse, neutral and first and second forward speed positions of lever 26. In the first forward speed position, contacts 44 provide power to a fixed contact 49, and in the second forward speed position, contacts 44 provide power to a fixed contact 50 of deck 25c. Second deck 25b includes five fixed contacts 51 connected to lead 45 and fixed contacts 52, 53, 54 and 55 connected to contacts 51 through movable contacts 56 in the third, fourth, fifth and sixth forward speed positions of lever 26. First deck 25a includes a fixed contact 57 which is connected to lead 45 through movable contacts 39 in the seventh position of shift lever 26. As further shown in FIG. 2, electrical leads 29 further include lines 58, 59, 60, 61, 62, 63 and 64 connected to contacts 49, 50, 52, 53, 54, 55 and 57, respectively.

As shown, power supply lead 45 includes a first branch 45a provided with a fuse 65 and connected to first fixed contacts 66 and a second branch 45b connected directly to fixed contact 67. As further shown in FIG. 2, backup alarm 36 and backup light 35 are connected to a fixed contact 68 of deck 25a for connection to power supply lead branch 45b when shift lever 26 is in the reverse position of FIG. 2.

Transmission switch 28 is connected through wires 29 to switching apparatus 25 and includes six decks, upshift decks 28a, 28b and 28c, and downshift decks 28d, 28e and 28f, which, as indicated above, are interconnected by shaft 33 to effect control of the deck settings by means of gear and detent mechanism 31. As shown in FIG. 3, the decks are in the extreme downshift position associated with the reverse setting of the shift lever 26. Solenoid 24 comprises the downshift solenoid, and in this arrangement, has received a final pulse through a downshift power line 69 to position spool 20 in its innermost, or extreme leftward (as seen in FIG. 3), position.

In providing the final downshift pulse, the transmission switch decks are in the neutral position, which is one position counterclockwise from the position illustrated in FIG. 3. The final downshift signal pulse is delivered to power line 46, therefore, from a downshift signal line 70 to a fixed contact 71 of deck 28d and moving contacts 72 thereof. The pulsed operation of solenoid 24 effects a delivery of oil through cylinder 22 causing an incremental movement of spool 20 to the position of FIG. 3. This movement, as discussed above, is communicated through gear and detent mechanism 31 to the shaft 33 of transmission switch 28 to rotate the decks 28a-28f to the position of FIG. 3, thus opening the circuit through deck 28d to downshift line 69 and thereby de-energize solenoid 24 to prevent further delivery of oil to cylinder 22.

Transmission switch 28 received the individual gear range signals from switching apparatus 25 such that when there is a difference in the setting of switching apparatus 25 from that of the transmission switch 28, a range signal will be delivered selectively through the upshift decks 28a, 28b or 28c, or downshift decks 28d, 28e, or 28f to either the downshift solenoid 24 or the upshift solenoid 23. As shown in FIG. 3, to effect such operation, upshift signal line 46 is connected to a fixed contact 73 of upshift deck 28c, a fixed contact 74 of downshift deck 28d, a fixed contact 75 of downshift deck 28e, and a fixed contact 76 of downshift deck 28f. Line 58 is connected to a fixed contact 77 of upshift deck 28c, a fixed contact 78 of downshift deck 28d, and a fixed contact 79 of downshift deck 28e. Line 59 is connected to a fixed contact 80 of upshift deck 28b, a fixed contact 81 of upshift deck 28c, a fixed contact 82 of downshift deck 28d, and a fixed contact 83 of downshift deck 28e. Line 60 is connected to a fixed contact 84 of upshift deck 28b, a fixed contact 85 of upshift deck 28c, a fixed contact 86 of downshift deck 28d, and a fixed contact 87 of downshift deck 28e. Line 61 is connected to a fixed contact 88 of upshift deck 28b, a fixed contact 89 of upshift deck 28c, and a fixed contact 90 of downshift deck 28d. Line 62 is connected to fixed contact 91 of upshift deck 28a, a fixed contact 92 of upshift deck 28b, a fixed contact 93 of upshift deck 28c, and a fixed contact 94 of downshift deck 28d. Line 63 is connected to fixed contact 95 of upshift deck 28a, a fixed contact 96 of upshift deck 28b, a fixed contact 97 of upshift deck 28c, and a fixed contact 98 of downshift deck 28d. Line 64 is connected to a fixed contact 99 of upshift deck 28a, a fixed contact 100 of upshift deck 28b, and a fixed contact 101 of upshift deck 28c. In addition to contact 71, line 70 is connected to a fixed contact 102 of downshift deck 28e and a fixed contact 103 of downshift deck 28f. A jumper line 104 is connected to fixed contact 105 of upshift deck 28c, a fixed contact 106 of downshift deck 28d, a fixed contact 107 of downshift deck 28e, and a fixed contact 108 of downshift deck 28f. The upshift power line 109 is connected to a fixed contact 110 of upshift deck 28a, a fixed contact 111 of upshift deck 28b, and a fixed contact 112 of upshift deck 28c. The downshift power line 69 is connected to a fixed contact 113 of downshift deck 28d, a fixed contact 114 of downshift deck 28e, and a fixed contact 115 of downshift deck 28f. The moving contacts of deck 28a include contacts 116, 117, and 118. The moving contacts of deck 28b include contacts 119, 120 and 121. The moving contacts of deck 28c include contacts 122, 123 and 124. The moving contacts 72 of deck 28d include contacts 125, 126 and 127. The moving contacts of deck 28e include contacts 128, 129 and 130. The moving contacts of deck 28f include contacts 131, 132 and 133.

As shown in FIG. 3, cylinder 22 includes oil passages 134 for directing the oil through the solenoid valves 135 and 136 controlled by solenoids 23 and 24, respectively, so as to incrementally move spool 20 selectively to the right or to the left with the movement being referred back to the transmission switch 28 through mechanism 31 controlling the position of shaft 33 which, in turn, controls the position of the movable contacts of the respective decks. Each incremental step of the shaft 33 causes the selected solenoid to become de-energized after providing a pulse of oil to the cylinder 22 so as to effect the desired incremental stepping of the transmission 12 either in an upshift or downshift direction as controlled by the setting of shift lever 26.

As discussed above, the present invention comprehends coordinating with the transmission control discussed above a dump body hoist control so as to prevent reverse movement of the truck inadvertently during a power drive operation of the dump body. More specifically, as shown in FIG. 3, hoist cylinder 17 is controlled hydraulically through a hoist valve 137 which is connected to a suitable source of pressurized hydraulic fluid 138 and a sump 139 in the conventional manner. The hoist valve is operated selectively by a hoist lever 140 which is also disposed in the truck cab 14 for manual control by the truck operator. As shown in FIG. 3, lever 140 may be selectively disposed in "raise," "hold," "float" and "down" positions. Valve 137 is constructed so as to be closed when the lever 140 is in the "hold" position so that the hoist cylinder 17 is maintained in a fixed position. Movement of lever 140 to the "float" position, permits controlled return of fluid from the hoist cylinder to the sump 139 so as to permit the dump body to float downwardly from an elevated position to a lowered position under the effect of its weight. In each of the "hold" and "float" positions, no power is being applied to the hoist cylinder from the hydraulic source 138 and, thus, in these positions, no correlation between the hoist valve and transmission control is required. However, in the "raise" and "down" positions, hydraulic power is applied through the valve to the hoist cylinder and ordinarily requires an increase in the truck engine speed to effect the power movement. Further, in conventional dumping action, the control lever 140 may be rapidly shifted between the "raise" and "down" positions so as to jar loose material which may have adhered to the truck body, such as wet or frozen cargo material.

As indicated briefly above, the acceleration of the engine by the operator to effect the desired powered operation of the dump body causes a hazardous situation to arise in prior art structures where the operator may inadvertently leave the transmission shift lever in the reverse position after backing up to a pit, enbankment, or the like. The acceleration of the engine under this condition may cause the movement of the truck into the pit or over the embankment, resulting in serious injury and damage.

The present invention effectively prevents such undesirable operation of the truck by effectively preventing a reverse drive of the truck whenever the hoist lever 140 is in either the "raise" or "down" positions. This control is effected in the present invention by means of a pair of limit switches 141 and 142 selectively controlled by a switch operator 143 carried for movement with lever 140 which, as shown in FIG. 3, may be pivotally mounted on a pivot 144 so as to cause closing of switch 142 when lever 140 is placed in the "down" position and closing of switch 141 when the lever 140 is placed in the "raise" position. Switches 141 and 142 are connected in parallel across lines 145 and 146. Line 145 is connected through a parallel pair of diodes 147 to the first upshift signal line 46. Line 146 is connected to downshift signal line 37. A positive battery signal is provided on upshift line 46 whenever positive battery potential is provided on line 37 and either of switches 141 and 142 is closed by the above discussed positioning of hoist lever 140.

A relay 148 is provided with a coil 149 connected between line 145 and ground G, and a switch 150 with normally closed contacts between lines 37 and 70 and normally open contacts between lines 145 and 146. Thus, when power is delivered to line 145 through the closing of either of switches 141 or 142 to energize coil 149, switch 150 closes its normally open contacts and thus holds in coil 149 to latch in relay 148.

The provision of power to the upshift line 46, as discussed above, provides power through fixed contact 73 and movable contact 124 of upshift deck 28c to provide power to the upshift power line 109 and thereby energize upshift solenoid 23 to provide a pulse of oil through valve 135 shifting spool 20 to the right and thereby removing the transmission from the reverse condition to the neutral condition and resultingly rotating shaft 33 one position in the counterclockwise direction to open the circuit to upshift power line 109 at switch deck 28c, permitting the transmission then to remain in the neutral condition. Relay 148 remains latched in thereby opening the circuit from downshift signal line 37 to line 70 thereby preventing operation of the downshift solenoid 24 by preventing delivery of voltage to any of the downshift decks 28d, 28e, or 28f from line 70.

As long as relay 148 remains latched in and shift lever 26 remains in the "reverse" position, hoist lever 140 may have no effect on the arrangement of the transmission. Thus, the conventional movement of the hoist lever 140 between the power "raise" and "down" positions does not remove the control from the neutralized condition even though switches 141 and 142 may both momentarily be open.

To restore the controls to the normal operating arrangement, it is necessary for the truck operator to manually move the shift lever 26 from the "reverse" position, shown in FIG. 2, such as to the neutral position. Such movement causes the shaft 38 of switch 25 to reposition the moving contacts of switch 25 to break the connection from power supply 45 to downshift signal line 37. Removal of the positive battery voltage from line 37 de-energizes coil 149 of relay 148 allowing the relay to become unlatched and reconnecting line 37 to line 70 to permit normal use of the shift lever 26 in controlling the movement of the truck. Once shift lever 26 is removed from the "reverse" position, hoist control lever 140 no longer effects operation of the transmission as diodes 147 prevent re-energization of coil 149 from line 46.

Thus, the present invention comprehends an improved transmission neutralizer which effectively upshifts the transmission to a neutral condition whenever the shift lever is in the "reverse" position and the operator attempts to drive the hoist body by a movement of the hoist lever to either a power "raise" or power "down" position. In the illustrated embodiment, the shifting of the transmission is effected by transferring a signal present on the final downshift signal line to the first upshift signal line to effect an upshifting of the transmission to the neutral condition by providing a pulse of oil to the upshift solenoid. The upshifting pulse of oil repositions the control spool and effects a repositioning of the transmission switch decks by a resultant movement thereof through a gear and detent mechanism connected to the transmission linkage. The control is arranged to prevent resetting of the transmission from the neutral condition when the shift lever is maintained in the "reverse" position notwithstanding any change in the positioning of the hoist lever, such as to nonpower positions, which may include "hold" and "float" positions as discussed above. This permits the operator to cycle the hoist cylinder between power "raise" and power "down" positions without affecting the maintained condition of the transmission in the neutral condition.

The improved control requires that the operator return the shift lever to the neutral position before the switches 25 and 28 are again synchronized to permit control of the transmission 12 by the shift lever 26 through the switching apparatus 25. The control is arranged so that when the shift lever is placed in the neutral position from the reverse position, no upshift action occurs as the transmission is already in the neutral condition.

The control means of the present invention is extremely simple and economical of construction, requiring a simple low cost additional relay and blocking diodes in cooperation with control switches operated by the dump body hoist lever. While the invention is extremely simple structurally, it provides an improved functioning not heretofore provided in the prior art and provides improved safety in the operation of dump trucks eliminating an extremely hazardous condition heretofore present in the use thereof.

The foregoing diclosure of specific embodiments is illustrative of the broad inventive concepts comprehended by the invention.

What is claimed is:

1. In a dump vehicle having a powered wheel drive including a transmission, manually operable transmission selector means selectively disposable in reverse, neutral, and forward positions, transmission control means responsive to said selector means for selectively arranging the transmission in corresponding reverse, neutral and forward positions for corresponding selective operation of the wheel drive, a dump body, and dump body control means including a manually operable control operable independently of said transmission selector means to selectively raise the dump body to a dump position for dumping a load therefrom and lower the dump body to a carrying position for carrying the load, the improvement comprising means responsive to said manually operable control for preventing reverse operation of the wheel drive irrespective of the disposition of the transmission selector means when the dump body control is arranged to move the dump body.

2. The dump vehicle improvement of claim 1 wherein said means for preventing reverse operation of the wheel drive comprises means for preventing arrangement of the transmission control means in the reverse position when the dump body control is arranged to move the dump body to the dump position.

3. The dump vehicle improvement of claim 1 wherein said means for preventing reverse operation of the wheel drive comprises means for preventing arrangement of the transmission control means in the reverse position when the dump body control is arranged to move the dump body to the dump position with the manually operable transmission selector means disposed in the reverse position.

4. In a dump vehicle having a powered wheel drive including a transmission, manually operable transmission selector means selectively disposable in reverse, neutral, and forward positions, transmission control means responsive to said selector means for selectively arranging the transmission in corresponding reverse, neutral and forward positions for corresponding selective operation of the wheel drive, a dump body, and dump body control means including a manually operable control operable independently of said transmission selector means to selectively raise the dump body to a dump position for dumping a load therefrom and lower the dump body to a carrying position for carrying the load, the improvement comprising means responsive to said manually operable control for preventing reverse operation of the wheel drive irrespective of the disposition of the transmission selector means when the dump body control is arranged to move the dump body and said transmission selector means is disposed in the reverse position.

5. The dump vehicle improvement of claim 4 wherein said means for preventing reverse operation of the wheel drive comprises means for shifting the transmission control means to neutral position while permitting said transmission selector means to remain disposed in said reverse position.

6. The dump vehicle improvement of claim 4 wherein said means for preventing reverse operation of the wheel drive comprises means for shifting the transmission control means to neutral position and maintaining the transmission control means in said neutral position while permitting said transmission selector means to remain disposed in said reverse position.

7. The dump vehicle improvement of claim 4 wherein said means for preventing reverse operation of the wheel drive comprises means for shifting the transmission control means to neutral position and maintaining the transmission control means in said neutral position notwithstanding a rearrangement of said dump body control to stop movement of the dump body to the dump position.

8. In a dump vehicle having a powered wheel drive including a transmission, manually operable transmission selector means selectively disposable in reverse, neutral, and forward positions, transmission control means responsive to said selector means for selectively arranging the transmission in corresponding reverse, neutral and forward positions for corresponding selective operation of the wheel drive, a dump body, and dump body control means selectively arrangeable in dump and carrying power positions to selectively raise the dump body to a dump position for dumping a load therefrom and lower the dump body to a carrying position for carrying the load, said dump body control means being further selectively arrangeable in a nonpower position intermediate the dump and carrying positions, the improvement comprising:

means for preventing reverse operation of the wheel drive irrespective of the disposition of the transmission selector means when the dump body control means is arranged in either of said power positions; and means for preventing reverse operation of the wheel drive notwithstanding repositioning of the dump body control means to the nonpower position when the transmission selector means is disposed to arrange the transmission in reverse position.

9. The dump vehicle improvement of claim 8 wherein the dump body control means is disposed adjacent the transmission selector means.

10. The dump vehicle improvement of claim 8 including means for causing the transmission to be disposed in the neutral position selectively when the transmission selector means is disposed in the neutral position irrespective of the position of the dump body control means, and when the transmission selector means is disposed in the reverse position and the dump body control means is arranged in either power position.

* * * * *